United States Patent [19]

Ina

[11] Patent Number: 4,937,779

[45] Date of Patent: Jun. 26, 1990

[54] INFORMATION RETRIEVING APPARATUS CAPABLE OF REARRANGING INFORMATION STORED IN MEMORY

[75] Inventor: Kenzoh Ina, Yokohama, Japan

[73] Assignee: Cannon Kabushiki Kaisha, Tokyo, Japan

[21] Appl. No.: 186,731

[22] Filed: Apr. 22, 1988

Related U.S. Application Data

[63] Continuation of Ser. No. 570,809, Jan. 16, 1984, abandoned.

[30] Foreign Application Priority Data

Jan. 20, 1983 [JP] Japan .................................. 58-6556
Jan. 20, 1983 [JP] Japan .................................. 58-6557
Jan. 20, 1983 [JP] Japan .................................. 58-6558

[51] Int. Cl.⁵ ............................................ G06F 12/02
[52] U.S. Cl. .............................. 364/900; 364/963.2; 364/964.6; 364/964.3
[58] Field of Search ... 364/200 MS File, 900 MS File

[56] References Cited

U.S. PATENT DOCUMENTS

| | | | |
|---|---|---|---|
| 3,975,715 | 8/1976 | Hutner | 364/900 |
| 4,064,489 | 12/1977 | Babb | 364/200 |
| 4,064,553 | 12/1977 | Kashio | 364/200 |
| 4,371,924 | 2/1983 | Schaefer et al. | 364/200 |

*Primary Examiner*—Thomas M. Heckler
*Attorney, Agent, or Firm*—Fitzpatrick, Cella, Harper & Scinto

[57] ABSTRACT

There is disclosed an information retrieving apparatus with an external memory such as a magnetic disk capable of rearranging information stored in memory. The apparatus is provided with a first memory for storing at least accessing data. A comparator comparts the data from the external memory with the accessing data. A second memory stores the retrieved pertinent i.e., data resulting from a comparison of the accessing data with data retrieved from the external memory. The retrieved pertinent data is supplied as retrieving data to the first memory in synchronization with the data transfer rate of the external memory to enable extraction of plural records from the external memory.

12 Claims, 7 Drawing Sheets

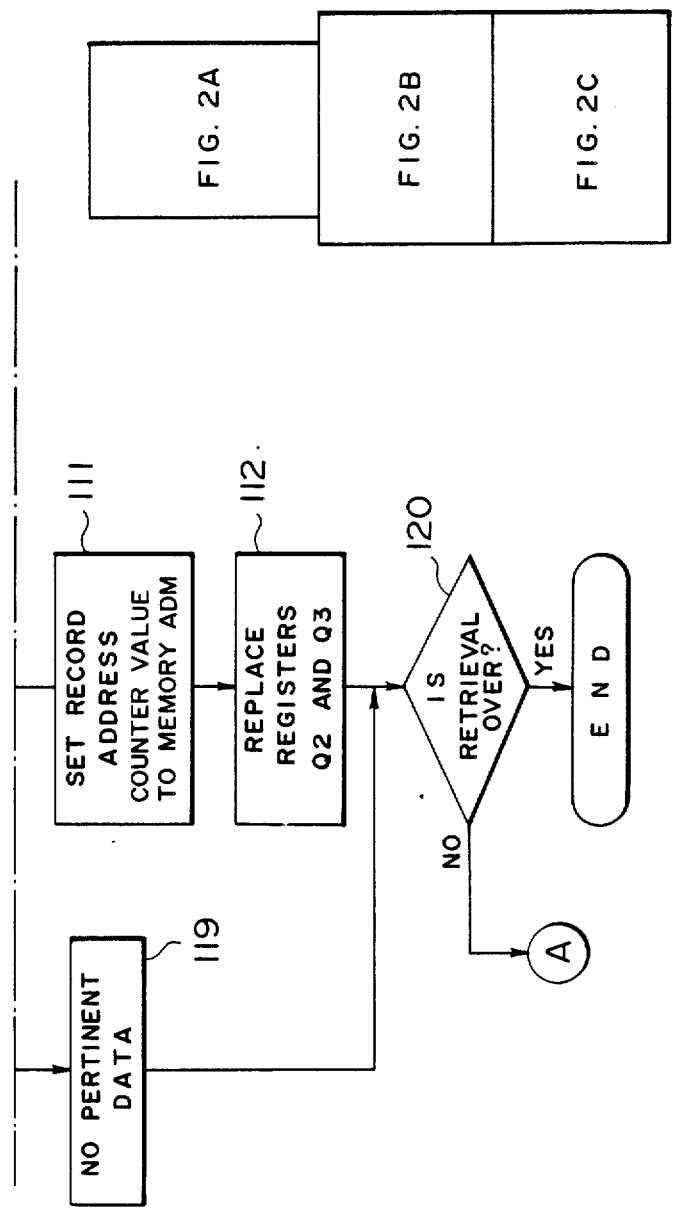

FIG. 3

INFORMATION RETRIEVING APPARATUS CAPABLE OF REARRANGING INFORMATION STORED IN MEMORY

This application is a continuation of application Ser. No. 570,809, filed Jan. 16, 1984, now abandoned.

BACKGROUND OF THE INVENTION

1. Field of the Invention

The present invention relates to a method, for use in an information retrieving apparatus, for controlling the storage of record addresses corresponding to data to be retrieved.

2. Description of the Prior Art

In information retrieving hardware, there is already known a method of storing the address of retrieved data i.e., the data being retrieved or data to be retrieved, or a record coinciding with the i.e., the data used for retrieving data in an exclusive address memory, and then temporarily interrupting the procedure or successively reviewing said record address. In the conventional retrieving method, however, only one record can be extracted in a step, and the extraction of plural records on a real-time basis is extremely difficult without a amount of hardware.

In an information retrieving apparatus equipped with an external memory, such as a magnetic disk, the extraction of desired information has been achieved by first transferring a large quantity of information from the external memory to a main memory in the central processing unit and retrieving the desired information from the main memory. A real-time retrieval of the information read from the magnetic disk only allows the extraction of a single record per access, so that in an application requiring plural records, there will be required as many as there are records to be retrieved acesses to the external memory. Such a real-time retrieval requires a correspondingly prolonged period of time.

SUMMARY OF THE INVENTION

In consideration of the foregoing, an object of the present invention is to provide an address storage controlling method enabling extraction of plural records within a single unit of processing time and also enabling flexible and inexpensive high-speed storage of the thus retrieved record addresses from an external memory, i.e., the record addresses resulting from the retrieving operation.

Another object of the present invention is to provide an information retrieving apparatus equipped with an external memory, comprising a first memory for storing data supplied from an external memory which is to be subjected to retrieval; a second memory for storing at least a the accessing retrieving data and the retrieved data; a comparator for comparing the contents of the first and second memories in synchronization with the processing speed of the first memory; a comparing condition memory for instructing comparing conditions to the comparator; an address control unit capable of controlling the second memory on a time-sharing basis; and a third memory for storing the result of comparison conducted in the comparator, wherein a plurality of data can be retrieved by accessing to the external memory.

Still another object of the present invention is to provide a memory control method, for use in an information retrieving apparatus equipped with an external memory and comprising a first memory for storing data supplied from the external memory and to be subjected to retrieval; a second memory for storing at least the accessing data and the retrieved data; a comparator for comparing the contents of the first and second memories; a comparing condition memory for instructing comparing conditions to the comparator; and an address control unit capable of controlling the second memory on a time-sharing basis, wherein the second memory is subjected to data read-out or data read-out and write-in on time-sharing basis in response to the results of the comparison conducted in the comparator and under the control of the address control unit, whereby at least accessing data and corresponding retrieved data stored in the second memory can be achieved by accessing to the external memory.

Still another object of the present invention is to provide an information retrieving apparatus equipped with an external memory, comprising a first memory for storing at least the accessing data; a comparator for comparing data supplied for retrieval from the external memory with the retrieving data in the first memory; a second memory for storing corresponding retrieved data; and means for storing data representing the retrieved data stored in the second memory as the accessing data in the first memory in synchronization with the data transfer rate of the external memory.

Yet another object of the present invention is to provide an information retrieving apparatus equipped with an external memory, comprising a first memory for storing at least the accessing data; a comparator for comparing data supplied for retrieval from the external memory with the accessing data in the first memory; a second memory for storing corresponding retrieved data; an address memory for storing the address, in the second memory, of at least one of the retrieved data; means for storing, in the address memory, the address data of said retrieved data stored in the second memory in synchronization with the data transfer rate of the external memory; and means for providing the comparator with, as accessing data, the retrieved data corresponding to the address data stored in the address memory.

BRIEF DESCRIPTION OF THE DRAWINGS

FIGS. 2A-2C, arranged as shown in FIG. 2, are a flow chart showing the function of the embodiment;

FIG. 3 is a chart showing the data flow in the sorting operation;

DETAILED DESCRIPTION OF THE PREFERRED EMBODIMENTS

Now the present invention will be clarified in greater detail by an embodiment shown in the attached drawings.

Figure 1:
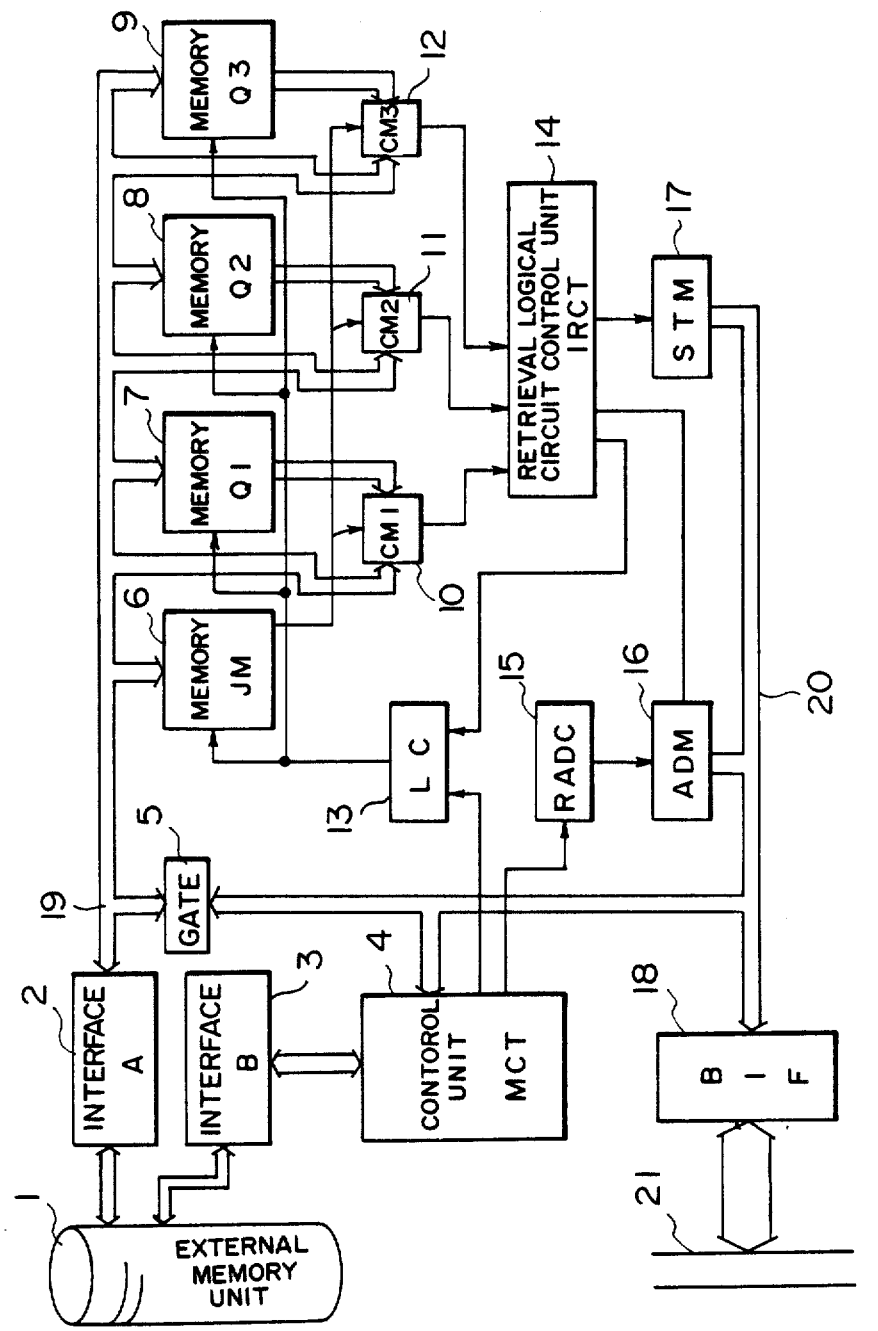
FIG. 1 is a block diagram of an embodiment of the present invention.

FIG. 1 is a block diagram showing an information retrieving apparatus embodying the present invention, wherein shown are an external memory (1) maintained under the control of the present information retrieving apparatus; an interface A (2) for controlling and transmit/receiving the clock signal and data of the external memory 1; and interface B (3) for transmitting addresses to the external memory 1 and receiving information returned from the external memory (1); a control unit MCT (4) for controlling the entire information retrieving apparatus, external memory (1), interfaces A (2), and B (2); a three-state gate (5) for switching internal bus lines, to be explained later, and for controlling the direction of data under the control of the control unit MCT (4); a memory JM (6) for temporarily storing information indicating the information retrieving method; a memory Q1(7) for storing the initial value of the accessing data; memories Q2 (8) and Q3 (9) functioning as buffer memories and retrieving registers for temporarily storing the data read from the external memory 1 for retrieval or for retrieving subsequent data with the thus temporarily stored data; a comparator CM1 (10) for comparing data read from the external memory 1 through the interface A (2) with the data read from the memory Q1 (7); comparators CM2 (11) and CM3 (12) for comparing the data from the external memory 1 with the data read from the memory Q2 (8) or Q3 (9); a length counter LC (1) for controlling the length of address and data to be retrieved in the memories JM (6), Q1 (7), Q2 (8) and Q3 (9); a retrieval logical circuit control unit IRCT (14) for logic control on the output signals from the comparators CM1 (10), CM2 (11) and CM3 (12), for controlling the function of the length counter LC (13) and for supplying predetermined control information to a retrieved record address memory ADM (16) and a retrieved record status memory STM (17) to be explained later; a record address counter RADC (15) for counting spaces between the data subjected to retrival in response to the output signal from the control unit MCT (4), storing each unit of data constituting a record as an address and supplying the same to the record address memory ADM (16) in response to an instruction from the retrieval logical circuit control unit IRCT (14); a record address memory ADM (16) for temporarily storing the record address contained in the record address counter RADC (16) according to the instruction of the retrival logical circuit control unit IRCT (14); a record status memory STM (17) for storing the status of the data to be retrieved, namely, information indicating the presence or absence of pertinent data; a bus interface BIF (18) for connecting the present information retrieving apparatus with an apparatus of upper hierarchy such as, data processing apparatus; a high-speed bus line MBUS (19) for passing original information from the external memory 1; a bus line SBUS (20) for passing signals indicating the memory status or the counter status and passing information to the bus interface BIF (18) under the control of the control unit MCT (4); and a bus line LBUS (21) for effecting communications through the bus interface BIF (18) between the present information retrieving apparatus and an apparatus of upper hierarchy.

In the following there will be given an explanation on the working principle of the above-described information retrieving apparatus constituting an embodiment of the present invention.

Figure 2A:
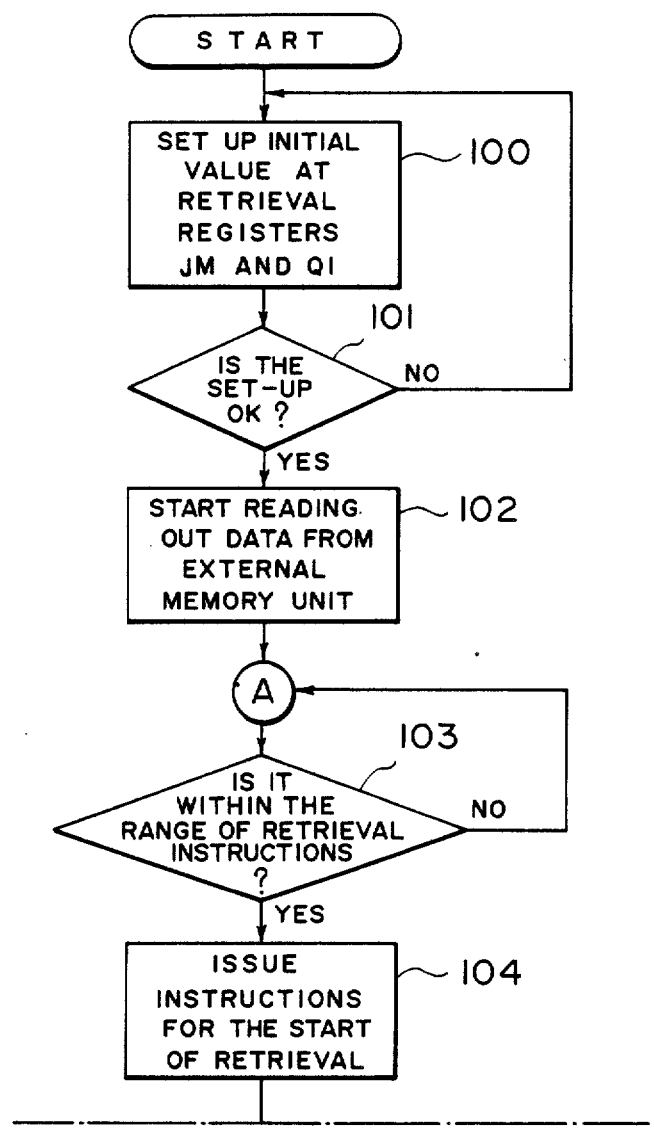
Figure 2B:
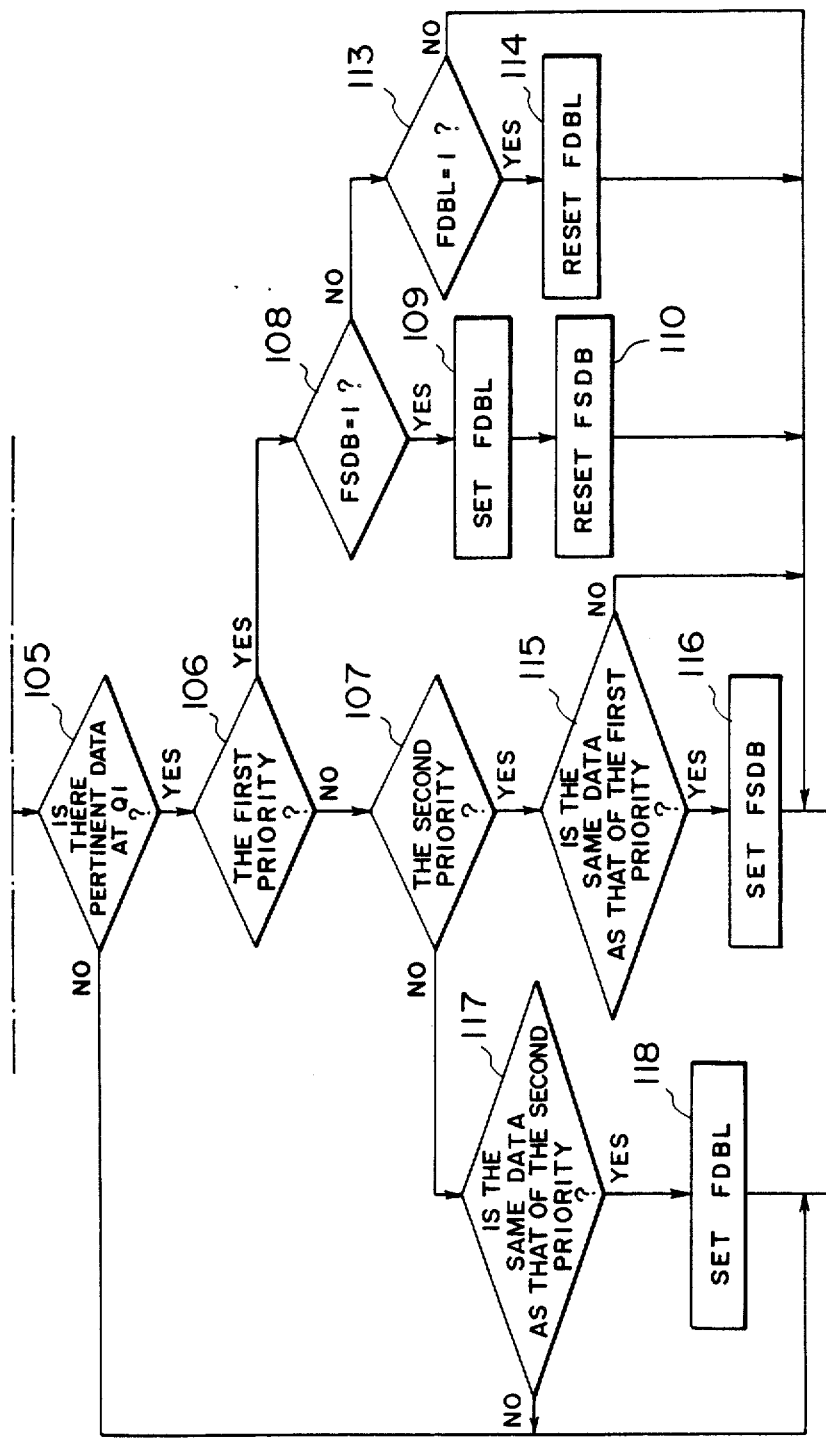

FIGS. 2A-2C, arranged as shown in FIG. 2, show a flow chart indicating the function of the above-described embodiment. At first, instructions and an address or a file name of the data to be retrieved in the external memory are transmitted, in a determined predetermined format, from the apparatus of higher hierarchy to the present information retrieving apparatus through the communicating means LBUS (21) shown in FIG. 1, and the information thus transmitted is decoded in the control unit MCT (4) for controlling the retrieving registers and external memory 1 through the interface B (3), thereby initiating the retrieving process. When predetermined initial values are set in the retrieving registers JM, Q1 (steps 100, 101), the external memory (1) enters the data read-out cycle (step 102). The program waits until the external memory 1 reaches an address an address where data retrieval is to be made, and, upon arrival at the address (step 103-Y), the control unit MCT (4) sends an instruction for initiating the retrieval to the length counter LC (13) and the record address counter RADC (15) (step 104), whereby the content of the memory Q1 (7) is compared, according to the content of the register JM (6) and in synchronization with the data read-out rate of the external memory (1), with the data read therefrom and supplied to the bus line MBUS (19) (step 105). The comparison is made respectively, in the former and latter halves of a clock cycle, by comparing the data subjected to retrieval with binary signals representing the initial values of an upper (or lower) limit and a lower (or upper) limit in order to identify whether the data subjected to retrieval is included in the initially selected range. If the presence of pertinent data is identified in the register Q1, then identification is made whether the data is of a first priority (step 106). If not, then identification is made whether the data is of a second priority (step 107).

Data is selected as of the first priority:

(1) if it is the first pertinent data item in the range instructed for retrieval; or (2) if it is closer to a target value than the pertinent data stored in the registers Q2, Q3. A target value is a value within preselected sorting limits. For example, if the retrieval range is from 50 to 100, and the data to be retrieved are arranged in ascending order, the target value is 50.

Data is selected as of the second priority:

(1) if it is the second pertinent data item in the range instructed for retrieval and it is further from the target value than the first pertinent data item or is the same as the first pertinent data item; or (2) if it is further from the target value than the first priority data but closer than the second priority data stored in the registers Q2, Q3. In this case the data is selected as a new second priority data in place of the original second priority data.

If the data is identified as of the first priority (step 106-Y), a flag FSDB indicates whether the data stored in the registers Q2 (8) and Q3 (9) are the same (step 108), and, if FSDB ≠1 indicating that said data are mutually different, said data is the first pertinent data item from the start of retrieval or is of a higher priority than the data stored in the registers Q2 (8) and Q3 (9). Thus a flag FDBL indicates the presence of data the same as that of the previous first priority, already identified, (step 113), and the flag is reset if it is already set (step 114). Then, in order to shift the retrieved data in the work area as the data of first priority, the content of the record address counter corresponding to the retrieved data is set in the address memory ADM (step 111), and the working area storing the retrieved data in the register Q2 (8) or Q3 (9) is selected as the retrieved data area, so that the data furthest from the target value in the registers is deleted and the area of the data is selected as a new area (step 112).

On the other hand, if FSDB=1 indicating that the pertinent data already in the registers Q2 (8) and Q3 (9) are equal, one of the data has to be deleted since the retrieved data is closer to the target value than the already existing pertinent data. Thus, the FDBL flag is set indicating the presence of previously retrieved data the same as the existing pertinent data (step 109), and the FSDB flag is reset indicating that the existing pertinent data are mutually equal (step 110).

Then, the content of the record address counter is set in the address memory ADM in the same manner as in the aforementioned case of FSDB=1, and one of the existing pertinent data that is later in time or that has a later, i.e., larger in number, address in the instructed range of retrieval is deleted (step 111), whereby the thus deleted data area in the register Q2 or Q3 is assigned as a working area for the succeeding record (step 112).

On the other hand, if the data is identified as not of the first priority (step 106-N), there is conducted a discrimination whether the data satisfies the aforementioned conditions for the second priority (step 107). If it is identified as of the second priority, there is conducted a discrimination whether the data of the second priority is equal to the data of the first priority (step 115), and, if both data are mutually equal, the FDBL flag is set indicating that the data stored in the registers Q2 (8) and Q3 (9) are mutually equal and serving to set the aforementioned flag FDBL when a new data of first priority is later found (step 116). Then, the content of the record address counter is set in the address memory ADM (step 114), and the area which contained the data of second priority is newly assigned as the working area and the area which contained the retrieved data is newly assigned as the retrieving data for a new data of second priority (step 112).

In case the data of second priority is different from the data of first priority, for example the former is smaller than the latter in the sorting process, such data of second priority is treated as ordinary pertinent data without the setting or resetting of flags. In such case the record address is set in the address memory ADM (step 111) and the area of memory which held the deleted data is secured as a newly available memory area (step 112).

In case the data is identified as not of the second priority in the step 107, there is conducted a discrimination whether the data is equal to the data of second priority (step 117), and, if it is equal, the FDBL flag is set indicating the presence of data the same as that stored in the register Q2 (8) or Q3 (9) (step 118). Thereafter, the process proceeds such as in the case of absence of pertinent data (step 119).

Figure 3:
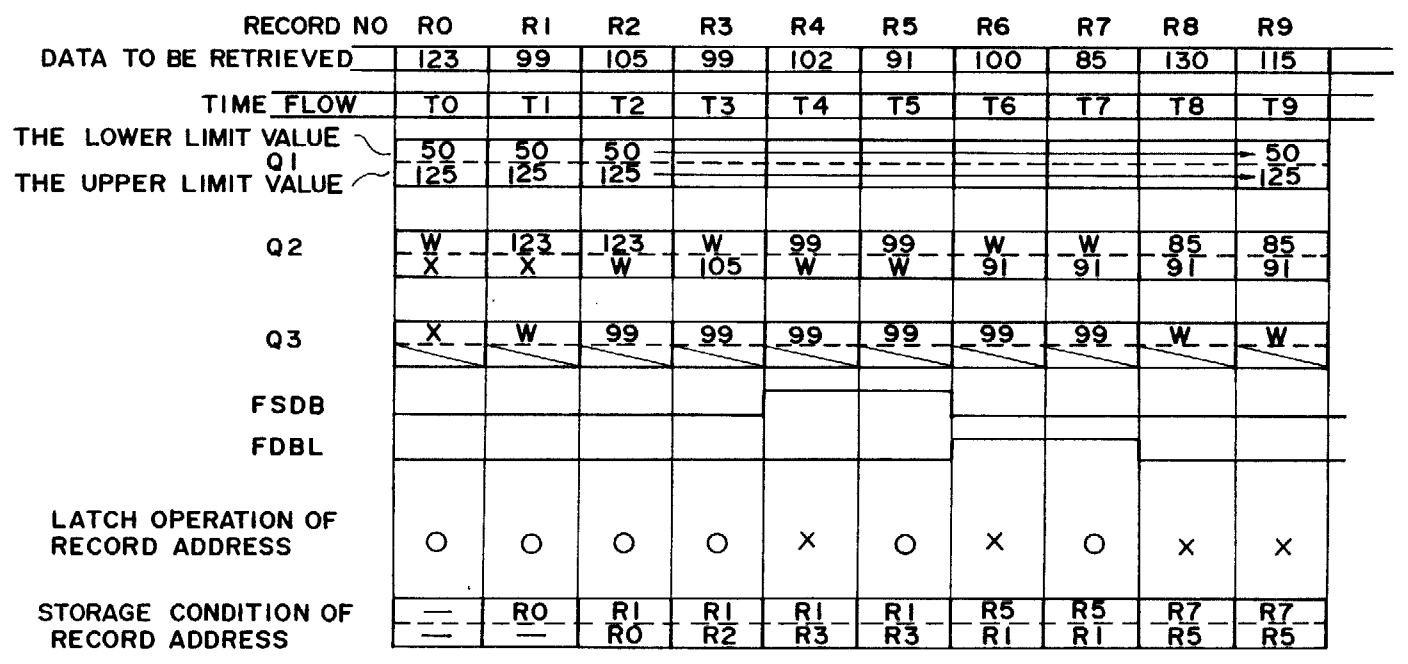

Now reference is made to FIG. 3 to explain the progress of data storage and comparison in time. FIG. 3 shows the data flow and the data storage in the registers Q1 (7), Q2 (8) and Q3 (9) in an example of sorting arbitrary numbers from 50 to 125. In FIG. 3, the time proceeds from T0 to Tn, and the data subjected to retrieval are read from the external memory such as a magnetic disk and divided into records NP, R0, R1, ..., Rn. The register Q1 (7) stores the target values, i.e., the limit values for sorting upper limit and lower limit for sorting, and discriminates whether data subjected to retrieval is contained in a desired range, corresponding to step 105 in the aforementioned flow chart. At T0, data R0=123, being positioned between 50 and 125, is identified as the pertinent data and is stored in the working area (W) of the register Q2 (8). At T1, data R1=99, being positioned between 50 and 125, is identified as the pertinent data in the registor Q1. Also, the register Q2 (8) identifies that the data R1=99 is smaller than 123, so that the data R1=99 is selected as the data of first priority while the data R0=123 is selected as the data of second priority. FIG. 3 also shows the status of record addresses, the first and second priorities, respectively, at top and at bottom. At T2, the data R2=105, being positioned between 50 and 125, is identified as pertinent, and further identified as between 99 and 123 in the registers Q2 and Q3. Consequently the data R0=123 is deleted from the second priority, and R1 and R2 are stored as the record addresses. At T3, the discrimination at the register Q1 is the same as at T2 and the registers Q2, Q3 discriminate a relation 99=99<105. Consequently, the data R2=105 is deleted, and the flag FSDB is set because the data of first priority is equal to that of second priority. At T4, data R4=102 satisfies the condition of the register Q1 but is identified as non-pertinent in the registers Q2, Q3 because of a relation 99=99<102. AT T5, the register Q1 identifies the data R5=91 as pertinent and the registers Q2, Q3 identify a relation 91<99=99. Therefore, the data R5=91 is selected as the data of first priority, and the data R3=99 is deleted. Since the flag FSDB=1 indicates the presence of equal plural data R3=99 and R1=99, the flag FDBL is set to indicate the presence of data the same as those stored in the registers. At T6, data R6=100 is identified as not being pertinent since it is positioned outside the values of 91 and 99 stored in the registers Q2 and Q3, though it satisfies the condition of the register Q1. At T7, data R7=85 satisfies the condition of the register Q1 and is identified in the registers Q2, Q3 smaller than 91 and 99. Thus, the data R7=85 is selected as the first priority, the data R5=91 is shifted to the second priority, and the data R1=99 is deleted. At the same time, the flag FDBL is reset since the data 99 is no longer stored in the registers Q2, Q3.

Figure 4:
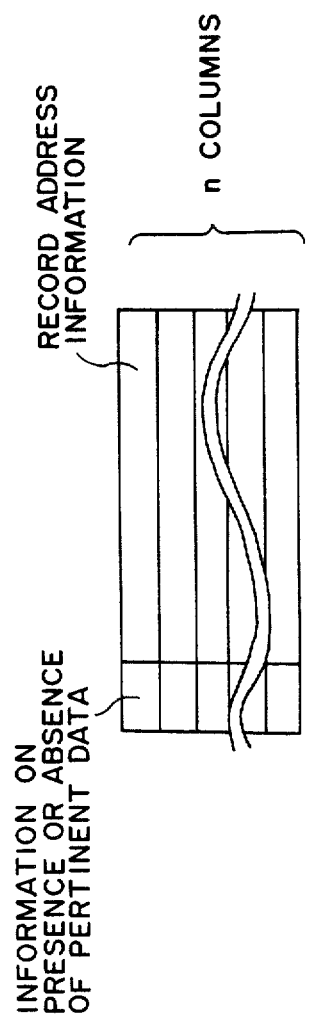
FIG. 4 is a chart showing the structure of record addresses.
Figure 5:
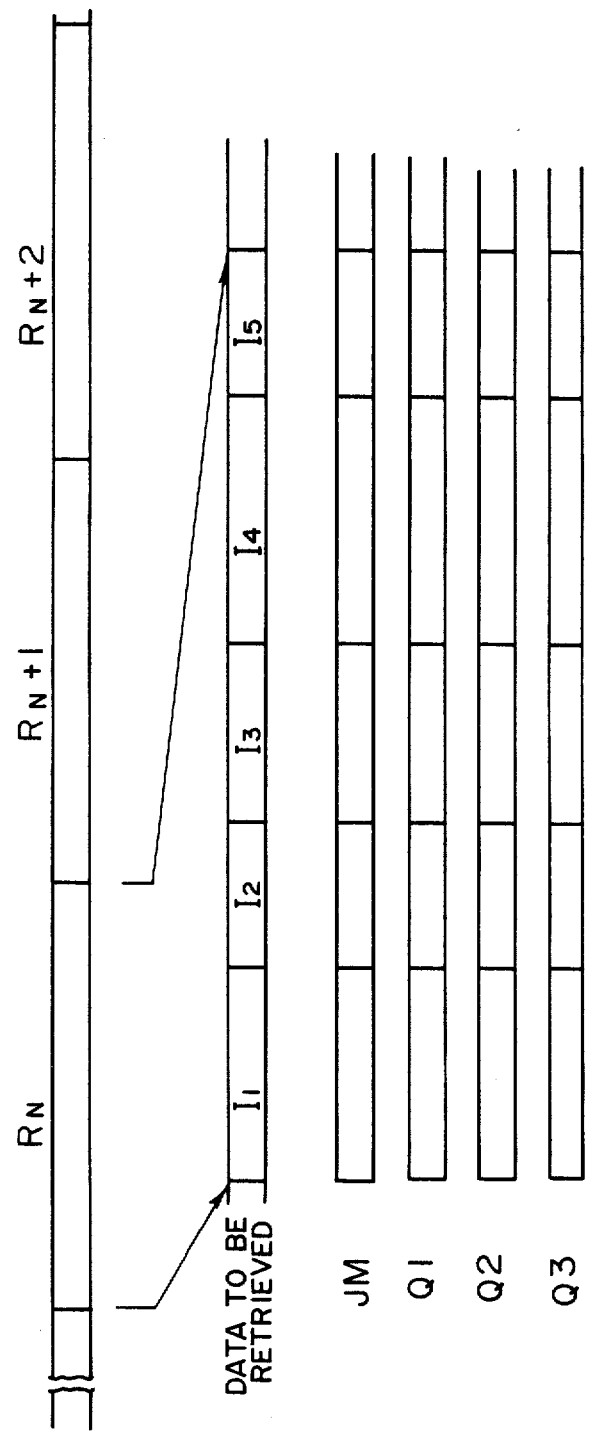
FIG. 5 is a chart showing the correspondence between the data to be retrieved and the registers.

The record addresses for each record is stored in the address memory ADM, with an additional signal at the top of the record addresses if it is identified as pertinent. The address memory ADM has a stack structure of n columns, so that the control unit MCT may check the data stored in said address memory ADM at an arbitrary time before the completion of record reading, thus extracting plural records and confirming the corresponding addresses in a single sorting process. A larger number of data can be extracted in one process if the capacity of the registers Q2, Q3 is selected closer to the capacity of the external memory. More specifically, the plural data stored in the external memory in a random order of magnitude can be rearranged, in a single access to said external memory, in the increasing or decreasing order of magnitude. FIG. 4 shows the structure of the record addresses, and FIG. 5 shows the relationship between the registers and the data subjected to retrieval, wherein I1, I2, ..., I5 represent items in each record Rn. Each item represents an information unit that can be used as a key reference in the retrieval and can be utilized in the retrieval with a logic product of items, for example I1·I2·I3 or with a logic sum of items, for example I1+I2+I3. Such retrieval can be achieved with a high speed and with a simple structure by comparing the same data with plural retrieving data on time-sharing bases according to the dimension of the registers Q2 and Q3.

As explained in the foregoing, the address storage control method of the present invention enables retrieval of plural information at a high speed within a single process time.

What I claim is:

1. A retrieving apparatus for retrieving data stored in an external memory, comprising:
   first memory means for storing accessing data used to retrieve desired data among data stored in said external memory;
   means for retrieving data from said external memory;
   comparator means connected to said first memory means and said external memory for comparing data retreieved from said external memory with the accessing data stored in said first memory means so as to select, among the retrieved data, pertinent data which has a defined relationship to said accessing data;
   second memory means for storing retrieved pertinent data, said second memory means storing the retrieved pertinent data while data to be retrieved from said external memory is retrieved from said external memory; and
   means for transferring from said second memory means to said first memory means, as accessing data in said first memory means, data representing said retrieved pertinent data stored in said second memory means, while data to be retrieved from said external memory is retrieved from said external memory.

2. A retrieving apparatus according to claim 1, wherein said second memory means stores a plurality of retrieved pertinent data.

3. A retrieving apparatus according to claim 2, wherein said plurality of retrieved pertinent data stored in said second memory means are selected according to a predetermined priority.

4. A retrieving apparatus according to claim 3, wherein said plurality of retrieved pertinent data are arranged in order according to a predetermineed priority.

5. A retrieving apparatus according to claim 1, wherein said comparator means comprises a plurality of comparator circuits connected to compare respective pairs of data from said first memory means and said external memory.

6. A retrieval apparatus according to claim 1, further comprising means for replacing the contents of said first memory means with those of said second memory means.

7. A retrieving apparatus for retrieving data stored in an external memory, comprising:
   first memory means for storing accessing data used to retrieve desired data among data stored in said external memory;
   comparator means for comparing data retrieved from said external memory with the accessing data stored in said first memory means so as to select, among the retrieved data, pertinent data which has a defined relationship to said accessing data;
   second memory means for storing retrieved pertinent data, said second memory means storing the retrieved pertinent data output from said comparator means while said comparator means compares data retrieved from said external memory with the accessing data;
   address memory means for storing an address at which at least one of said retrieved pertinent data is stored in said second memory means;
   means connected to said address memory means for storing, in said address memory means, the address of said at least one retrieved pertinent data stored in said second memory means in synchronization with a data transfer rate at which data is retrieved from said external memory; and
   means connected to said address memory means for supplying, as accessing data for comparison by said comparator means, the at least one retrieved pertinent data corresponding to said address stored in said address memory means, while said comparator means compares data retrieved from said external memory with the accessing data.

8. A retrieving apparatus according to claim 7, wherein said second memory means stores a plurality of retrieved pertinent data.

9. A retrieving apparatus according to claim 8, wherein said plurality of retrieved pertinent data stored in said second memory means are selected according to a predetermined priority.

10. A retrieving apparatus according to claim 9, wherein said plurality of retrieved pertinent data are arranged in order according to a predetermined priority.

11. A retrieving apparatus according to claim 7, wherein said comparator means comprises a plurality of comparator circuits connected to compare respective pairs of data from said first memory means and said external memory.

12. A retrieving apparatus for retrieving data stored in an external memory, comprising:
   means for retrieving data from said external memory;
   first memory means for storing data retrieved from said external memory;
   second memory means for storing at least accessing data used to retrieve desired data among data stored in said external memory;
   address memory means for storing an address at which at least one of said data stored in said second memory means is stored in said second memory means;
   comparator means for comparing the contents of said first and second memory means;
   comparing condition memory means for effecting a comparing condition operation in said comparator means; and
   transfer means for transferring the contents of said first memory means to said second memory means on the basis of a result of comparison by said comparator means.

* * * * *

UNITED STATES PATENT AND TRADEMARK OFFICE
CERTIFICATE OF CORRECTION

PATENT NO. : 4,937,779

DATED : June 26, 1990

INVENTOR(S) : KENZOH INA

Page 1 of 3

It is certified that error appears in the above-identified patent and that said Letters Patent is hereby corrected as shown below:

On the title page:

AT [73] ASSIGNEE

"Cannon Kabushiki Kaisha," should read
--Canon Kabushiki Kaisha--.

AT [57] ABSTRACT

Line 5, "comparts" should read --compares--.
Line 7, "pertinent i.e.," should read
--pertinent data, i.e.,--.

SHEET 1 OF 7

FIG. 1, "CONTOROL" should read --CONTROL--.

COLUMN 1

Line 19, "the i.e.," should read --the data i.e.,--.
Line 25, "a amount" should read --a large amount--.
Line 30, "the" should read --an--.
Line 37, "many as" should read --many accesses to the external memory as-- and "retrieved accesses to the" should read --retrieved.--.
Line 38, "external memory." should be deleted.
Line 55, "a the" should read --the--.
Line 64, "to" should be deleted.

COLUMN 2

Line 16, "to" should be deleted.
Line 57, "EMBODIMENTS" should read --EMBODIMENT--.
Line 68, "and" should read --an--.

UNITED STATES PATENT AND TRADEMARK OFFICE
CERTIFICATE OF CORRECTION

PATENT NO. : 4,937,779

DATED : June 26, 1990

INVENTOR(S) : KENZOH INA

It is certified that error appears in the above-identified patent and that said Letters Patent is hereby corrected as shown below:

COLUMN 3

Line 64, "determined" should be deleted.

COLUMN 4

Line 1, "controling" should read --controlling--.
    Line 8, "an address" should be deleted.
    Line 53, "Thus" should read --Thus,--.
    Line 65, "new area" should read --new work area--.

COLUMN 5

Line 51, "progress" should read --process--.
    Line 55, "TO" should read --T0--.
    Line 57, "records NP, RO, Rl,...,Rn." should read --records N0, R0, Rl,..., Rn.
    Line 60, "data" should read --the data--.
    Line 62, "T0," should read --T0,--.
    Line 63, "R0=123," should read --R0=123,--.

COLUMN 6

Line 2, "data R0=123" should read --data R0=123--.
    Line 18, "AT" should read --At--.
    Line 38, "addresses" should read --address--.

COLUMN 7

Line 9, "retreieved" should read --retrieved--.
    Line 35, "predetermineed" should read --predetermined--.

UNITED STATES PATENT AND TRADEMARK OFFICE
CERTIFICATE OF CORRECTION

PATENT NO. : 4,937,779

DATED : June 26, 1990

INVENTOR(S) : KENZOH INA

Page 3 of 3

It is certified that error appears in the above-identified patent and that said Letters Patent is hereby corrected as shown below:

COLUMN 8

Lines 45-48, "which at least one of said data stored in said second memory means is stored in said second memory means;" should read
--which at least one of said data is stored in said second memory means;--.

Signed and Sealed this

Twenty-fourth Day of September, 1991

Attest:

HARRY F. MANBECK, JR.

Attesting Officer

Commissioner of Patents and Trademarks